United States Patent
Habisreitinger et al.

(10) Patent No.: US 6,699,346 B1
(45) Date of Patent: Mar. 2, 2004

(54) METHOD AND DEVICE FOR APPLYING A SELF-ADHESIVE PROTECTIVE FILM TO CAR BODIES

(75) Inventors: Uwe Habisreitinger, Freudenstadt (DE); Bernhard Nordmann, Böblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/623,607

(22) PCT Filed: Feb. 4, 1999

(86) PCT No.: PCT/EP99/00742

§ 371 (c)(1),
(2), (4) Date: Oct. 20, 2000

(87) PCT Pub. No.: WO99/44891

PCT Pub. Date: Sep. 10, 1999

(30) Foreign Application Priority Data

Mar. 5, 1998 (DE) .......................... 198 09 515

(51) Int. Cl.⁷ .......................... B26D 5/20; B29C 63/02; B65B 33/04; B65B 41/04
(52) U.S. Cl. .......................... 156/229; 156/71; 156/212; 156/251; 156/252; 156/486; 156/494
(58) Field of Search .......................... 156/229, 71, 486, 156/494, 212, 252, 251; 280/770, 848; 206/335

(56) References Cited

U.S. PATENT DOCUMENTS

| | | | | |
|---|---|---|---|---|
| 5,127,974 A | * | 7/1992 | Tomiyama et al. | 156/85 |
| 5,997,670 A | * | 12/1999 | Walter et al. | 156/71 |
| 6,032,713 A | * | 3/2000 | Ishibuchi et al. | 156/361 |

FOREIGN PATENT DOCUMENTS

| | | |
|---|---|---|
| DE | 29622887 | 8/1997 |
| JP | 06156339 | * 6/1994 |
| JP | 06254451 | 9/1994 |
| JP | 06255873 | 9/1994 |
| JP | 06271173 | 9/1994 |
| JP | 07033311 | 2/1995 |

OTHER PUBLICATIONS

Copy of PCT Search Report.
Machine translation of JP 06–255,873 from the Japanese Patent Office IP digital library website. http://www.ipdl.jpo.go.jp/homepg_e.ipdl.*

* cited by examiner

Primary Examiner—Richard Crispino
Assistant Examiner—Sue A. Purvis
(74) Attorney, Agent, or Firm—Crowell & Moring LLP

(57) ABSTRACT

A method for the automated, series application of a self-adhering protective film to a surface portion of vehicle body includes (1) readying of a film piece, pulled off from a supply roll, in a readying station in a stretched-out, fold-free state by at least one holding element; and (2) pulled off the film piece to the desired length from the supply roll, cutting off the film piece and holding on opposite edges, with the fold-free stretched-out state being retained and being transferred into the application station. The next film piece, which is pulled behind by the film piece is held stretched out in the fold-free state by the at least one holding element of the readying station. The film piece is applied to the body by lowering it in a positionally correct manner, by the at least one application robot, onto an associated surface portion of the body and is pressed onto the portion in a fold-free and bubble-free manner.

29 Claims, 12 Drawing Sheets

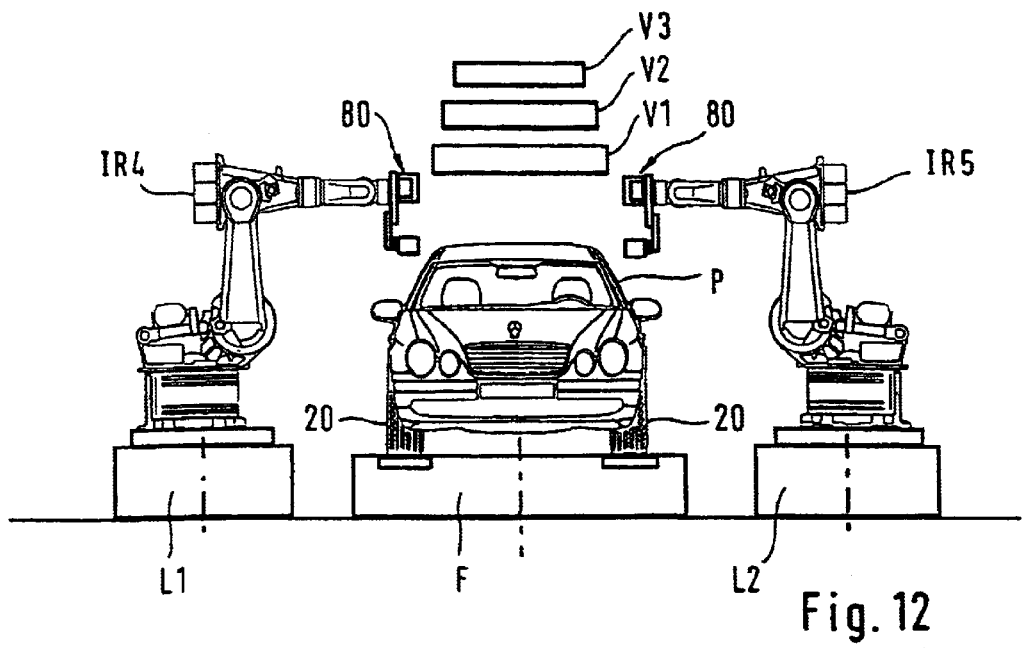
Fig. 12
Fig. 13
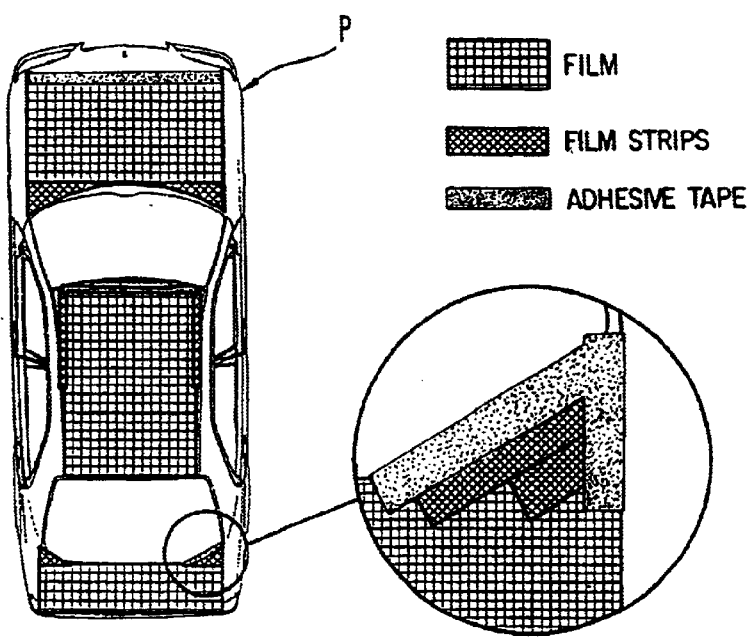

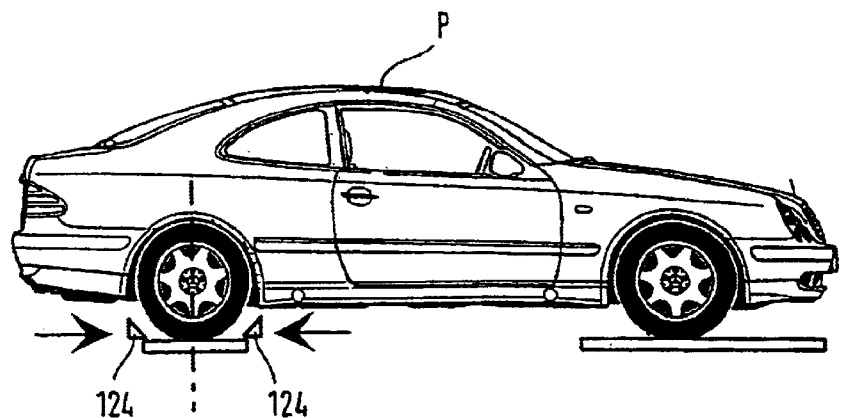
Fig. 16
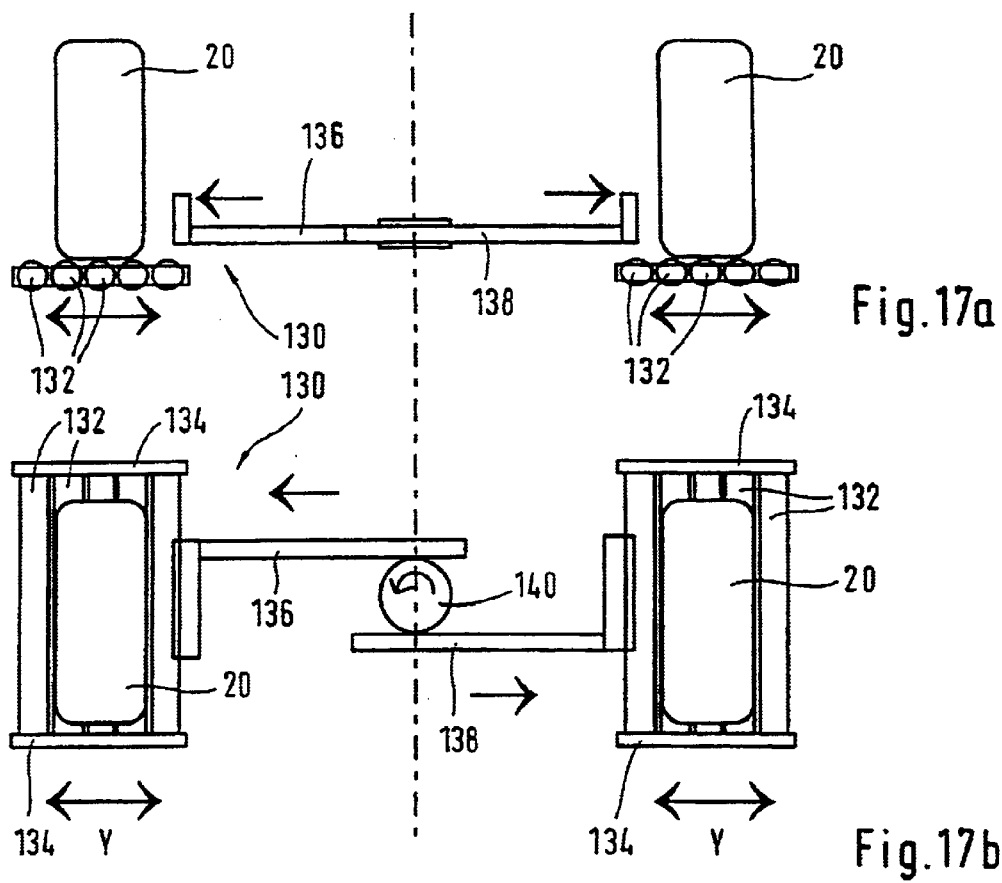
Fig. 17a
Fig. 17b

METHOD AND DEVICE FOR APPLYING A SELF-ADHESIVE PROTECTIVE FILM TO CAR BODIES

BACKGROUND AND SUMMARY OF INVENTION

The present invention relates to a method and apparatus for applying self-adhering protective film to vehicle bodies for the protection of vehicles, in particular during the transport thereof.

In the series production of many vehicle manufacturers, the vehicles have to be prepared for despatch in such a manner that they do not become damaged, in particular in such a manner that the paintwork is not impaired by transport and effects of the weather. If journeys by train or even transport by ship are necessary for the transfer to the customer, the vehicles have been covered for this purpose with a wax protective layer which has to be removed again before delivery to the customer. The residue-free removal of the protective wax has not only been personnel-intensive work, but also had an impact on health and the environment because of the solvents used in this case. Moves have, therefore, been recently made to protect the vehicle bodies during transportation by means of self-adhering films; however, only the essentially horizontally lying surface portions of the vehicle body which are at risk from the weather and deposits have been protected in this manner. Because this type of protection is not only very effective but also relatively expensive, this type of protection has not only been provided as protection during transportation, but also as protection during the vehicle assembly and, accordingly, the protective film has already been applied prior to the final assembly of the vehicle, i.e. directly after painting the vehicle body.

The protective film is to be applied in a manner which is as free as possible from folds and bubbles, because under folds or bubbles, after a certain storage time, a micro-climate can form which, depending on the type and colour of the paint, can lead under some circumstances to visible streaks. In order to be able to apply the protective films carefully, the film blanks have previously had to be held by four people, brought over the vehicle, aligned and placed onto the associated surface portions. Despite the high outlay on personnel, it has not always been possible to avoid folds or bubbles during application of the protective film. During the subsequent cutting free of the regions for add-on parts, the paintwork frequently suffered damage requiring costly refinishing work. The procedure for the previous, manual application of the protective film is as follows: first of all, a rectangular piece of protective film, which is matched in terms of size to a surface portion, is pulled off and cut from a supply roll by at least two people, a total of four people having to pick it up. This protective film piece was stretched out freely by the four people using their free hands with the self-adhering side pointing downwards, brought over the vehicle body in this manner and lowered there in a horizontal position onto the associated surface portion in a positionally correct manner, then placed on in a more or less fold-free and bubble-free manner and pressed on by brushing with a soft, slidable object, for example a stiffened piece of felt. In the region of gaps to adjacent vehicle body parts, such as mudguards or doors, which have been glued over, the protective film was cut through manually with a knife and the cut edges pressed on by hand. In order to be able to cut free and cut out the protective film in a manner correct for assembly in the region of add-on parts, such as roof decorative bars, sliding-roof covers, radiator mascot, washer nozzles for windows, aerials, window frames or the like, during the manual film application a flat strip-shaped template has previously been placed in a positionally correct manner onto the vehicle body and this template has likewise been glued over with the protective film to be applied, so that at the regions which are to be cut free the film has not only been held at a small distance from the vehicle body surface, but, by means of the template, a cutting and guide edge for a knife is also formed, along which edge the film can be separated in a contour-correct manner. Working with a sharp-edged knife in close proximity to the painted vehicle body surface has, in the hectic rush, despite continuous practice, time and again resulted in damage to the paint and in costly refinishing work.

This prior art corresponds at least to the manufacturing practice of the applicant; since, for environmental protection reasons, the United States no longer permits protective waxing for vehicle despatch, other vehicle manufacturers are probably turning to a similar film protective system for their vehicles during despatch. However, a prior publication concerned with this is not known to the applicant.

In German Patent Application 196 42 831.9 of Oct. 17, 1996, the applicant describes a method and an apparatus for applying protective film to bodies of passenger vehicles in which, for the purpose of automating the application of the film to the vehicle body, a rectangular piece, of predetermined size, of a protective film from a supply roll is grasped, on the non-adhering side, using a robot-guided clamping-frame, and is pulled off and cut from the supply roll. Before the film blank is placed onto the vehicle body, in the freely stretched-out state, tear-off lines are perforated, from the non-adhering film side thereof, in the region of add-on parts by means of a heated indenting disc, guided mechanically along defined contour lines. Only then is the protective film which is prepared in this manner and is stretched out in a fold-free manner in the clamping frame lowered by the handling robot onto the associated surface portion in a positionally correct manner and placed on in a bubble-free manner. The film is then pressed on with a brushing strip. Since, during and after the application of the film, the clamping frame requires a certain working space in order to apply the protective film in a manner which is as free of bubbles and folds as possible, and since it executes certain pivoting movements, it is only suitable for use for applying films to freshly painted body shells. Using the described clamping frame for the application of films to ready-fitted vehicles is only possible to a severely limited extent, since various fitted parts, for example the windscreen, external mirror, aerial, radiator mascot, etc., restrict the required working space and adversely affect the necessary pivoting movements of the clamping frame. Furthermore, the application of the film using the described clamping frame before the assembly is followed by a manual working step in which protruding, pre-perforated film sections have to be removed. However, in the case of the finished vehicle it is often not possible to place relatively large, protruding film piece onto the corresponding vehicle region, and subsequently to tear off the protruding film along perforation lines, since the protruding film parts, even as they are being placed on, can become stuck to the add-on parts, or, because of the restriction in the clamping of the film, the entire placing-on can be prevented by the add-on parts. Therefore, where required, first of all a relatively small, non-protruding film piece is placed onto the vehicle body. After that, the free regions which are not yet covered are taped down with film strips.

Taking this as the starting point, the invention is based on the object of providing a method and an apparatus for the application of protective film to vehicle bodies, which method offers the user greater flexibility. In particular, it is the aim of the invention, along with more substantial automation, i.e. saving on labour, to propose a method and an apparatus which can be used irrespective of location, both for applying film to painted body shells and also to ready-fitted vehicles.

According to the invention, the film which is to be applied is provided in the form of at least one supply roll in a film-readying apparatus. For this purpose, the film is held in the stretched-out state between two holding elements, preferably suction rails. Within this stretched-out film piece, contour lines along which corresponding film parts can be pulled off again can be perforated in the film using a perforating tool. This may also be required in the case of the finished vehicle, in order to expose, for example, washer nozzles, so that their complete functioning is ensured during the transfer journey.

The perforating tool preferably has at least one heated indenting disc, which is suspended in a floating manner. Alternatively, the perforation can also be carried out using heated gougers or using a laser.

The perforating tool can be guided by different components, for example, SCARA-robots, bent-arm robots or X-Y moving units.

According to the invention, the film which is to be applied is pulled off in a film-readying station from a supply roll to a predetermined length by at least one industrial robot, using at least one holding element, preferably a suction rail, and is held in a stretched state in a waiting position. The film piece held stretched in this manner is picked up at the rear end of the pulled-off film piece by at least one further industrial robot using at least one holding element, preferably a suction rail. The stretched-out film piece is then cut off from the supply roll and subsequently applied to a vehicle body.

After the application of the film, in the same or a further station, using at least one industrial robot with at least one taping down tool, film is applied in the form of film strips to body parts which are still free and which have not yet been covered by the previously applied, rectangular film sections. Furthermore, in this station edges of the applied film which are exposed to the wind are taped down by means of securing adhesive tape. Subsequently, joints and beads of the bodywork which have been glued over by the film are cut free.

By means of the transfer according to the invention of the film to be applied using two holding elements, preferably suction strips, aligned parallel to each other and acting on opposite film ends, an automated application of the film to ready-fitted motor vehicles is made possible, since a rigid clamping frame surrounding the entire film piece is no longer provided, which clamping frame, because of its working space or its pivoting movements, would have to dip, for example, into a region occupied by the windscreen in the finished vehicle. For the handling, by means of two suction strips, of the film section which is to be applied, the suction strips can be moved along with the film held by them, over the vehicle body section to which the film is to be applied, and by uniform lowering can apply the film to this vehicle body part. In the process, the suction strips are guided in such a manner that during the lowering of the film onto the vehicle body part they are guided past next to this vehicle body part, while the other two edges of the film are exposed.

In order to enlarge the working space for the robot-guided perforating tool, the robot-guided holding elements for the film, and also the robot-guided taping down tool, the industrial robots are preferably placed on linear axes. In an advantageous design, for this purpose a linear axis extending over a number of stations can be used per vehicle side, all of the robots of the corresponding side sitting on the said linear axis, on their own moving slides in each case. As a result, the work can be distributed both concentrated to one station in each case and also over a number of stations, for the purpose of optimizing the cycle time.

The invention is illustrated schematically in the drawing with reference to exemplary embodiments and is described in detail in the following with reference to the drawing.

BRIEF DESCRIPTION OF THE DRAWINGS

FIG. 12 shows a front view of the station for taping down a passenger vehicle with a film strip and/or safety tape.

FIG. 13 shows a ready-prepared motor vehicle provided with film, film strips and adhesive tape, in plan view.

FIG. 16 shows, in a lateral, schematic illustration, the vehicle positioning in the longitudinal direction.

FIG. 17 shows the principle of the vehicle positioning in the transverse direction by means of rolls arranged longitudinally.

DETAILED DESCRIPTION OF THE DRAWINGS

Figure 1:
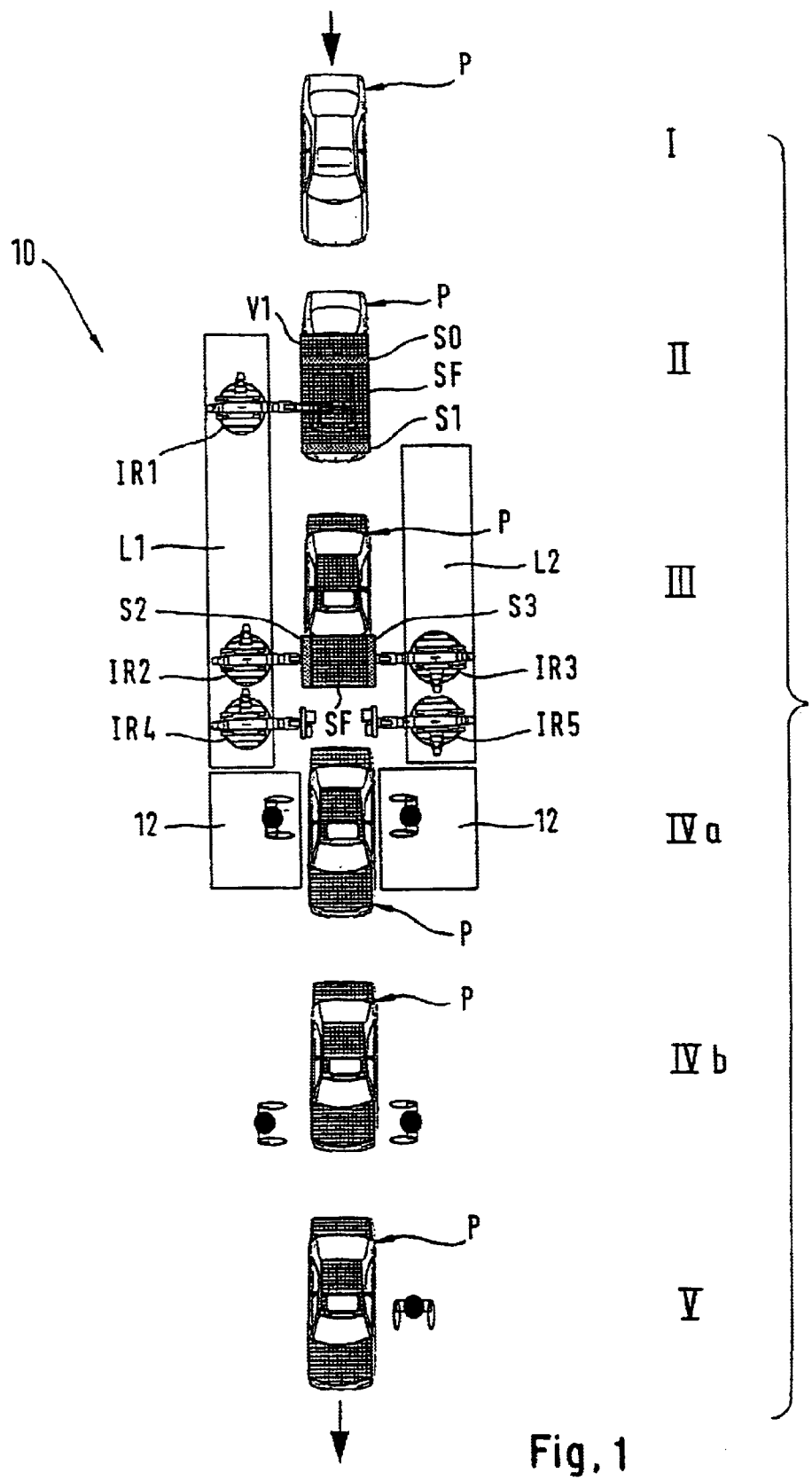
FIG. 1 shows the layout of a production line for the automated, series application of protective film to motor vehicles in plan view.

FIG. 1 shows, in a plan view, an application line 10 for the automated, series covering of motor vehicles with protective film. The application line 10 illustrated in FIG. 1 shows the application according to the invention of protective film to vehicle bodies, using the example of a passenger vehicle P conveyed cyclically along the application line 10. The method according to the invention can, however, be used on all types of motor vehicles, particularly also on delivery vehicles, lorries, and the like. Furthermore, the application according to the invention of protective film is not restricted to the covering of ready-fitted vehicles, but can also be integrated into the production line and used, for example, on painted body shells.

The application line 10 comprises a first station I, in which the passenger vehicle P is placed into the conveyor system F (not illustrated in greater detail in FIG. 1) of the application line 10. This is in principle comparable, for example, to driving a passenger vehicle into a car wash.

A downstream readying station II of protective film which is to be applied comprises at least one supply roll V1 for protective film which is readied in a fold-free, stretched-out state using suitable holding devices. The station II can furthermore, as illustrated, comprise a first industrial robot IR1 which has a perforating tool and serves for perforating the protective film readied in the stretched-out state. The station II is described in detail below with reference to FIGS. 2 to 4.

In a further station III for covering the passenger vehicle P with protective film, a total of four industrial robots IR2 to IR5 are provided. The industrial robots IR2 to IR5 are in each case arranged moveably opposite one another in pairs on linear axes L1 and L2. The first pair IR2, IR3 of the industrial robots serves as an application robot and has a respective suction strip S2 and S3 by means of which the film readied in the station II is transferred, by movement of the application robots IR2, IR3, along the linear axes L1, L2, is aligned over that region of the passenger vehicle P which is to be covered and is placed on. Doctor blades which can be retracted and extended are advantageously attached to the suction strips of the application robots IR2 and IR3. Therefore, directly after the film is placed on, the doctor blades can be used to doctor the film onto the vehicle body. In addition to the covering of the passenger vehicle P with extensive foil pieces, the industrial robots IR4, IR5 are used to tape down, with film strips, vehicle body parts which have not yet been covered, and also to tape down, with securing tape, film edges which are exposed to the wind. In addition, the taping down tool advantageously has a cutting tool with which the joints and gaps and also engine bonnet beads can be cut open. The design and functional sequence of the station III is described in detail below with reference to FIGS. 5 to 14.

The station III is adjoined by stations IVa and IVb for carrying out remaining manual work. The station IVa comprises two platforms 12 which are respectively arranged on the left and right of the passenger vehicle P in order to facilitate manual work on the roof. The manual work on the engine bonnet and on the boot lid of the passenger vehicle P are carried out at ground level in the station IVb.

The last station of the application line 10 is the exit station V in which the passenger car P is brought out of the conveyor system F and out of the application line.

Figure 2:
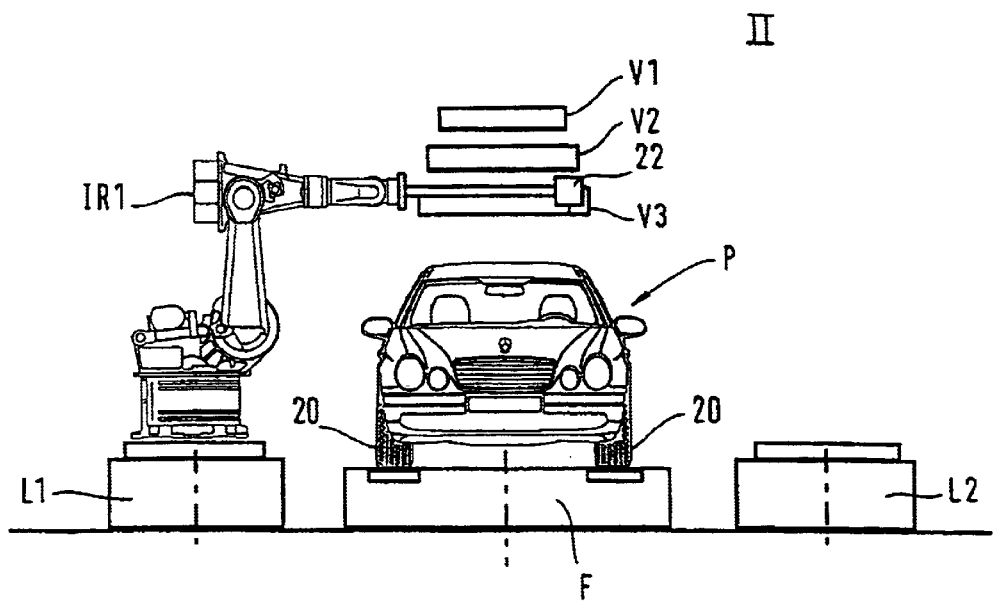
FIG. 2 shows a front view of the station for the readying and perforating of protective film of the application line from FIG. 1.

FIG. 2 shows, in a front view, the passenger vehicle P in the station II of the application line 10. The passenger vehicle P is standing with its wheels 20 on the conveyor system F, which is described in detail below with reference to FIGS. 15 to 18.

In the illustration of FIG. 2, the industrial robot IR1 is arranged on the left next to the passenger vehicle P on the linear axis L1 which is designed in the manner of a platform. The industrial robot IR1 can be moveable, but does not have to be, along the linear axis L1.

Figure 3:
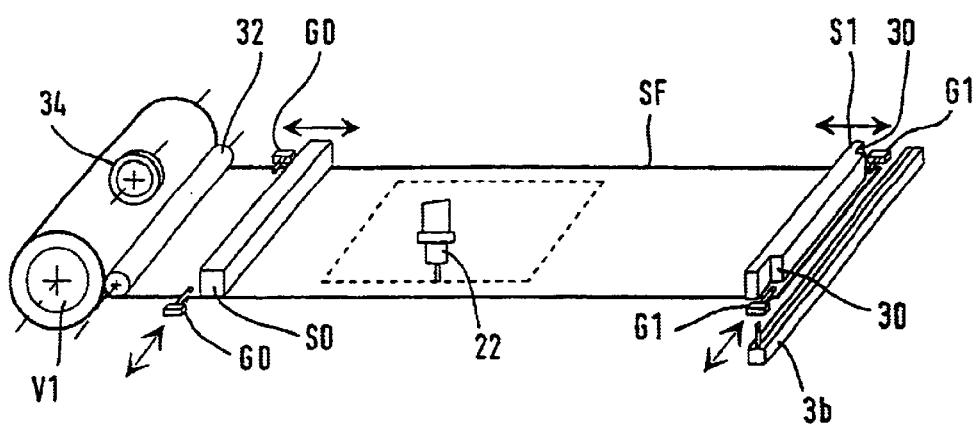
FIG. 3 shows, in a perspective illustration and schematically, the design of the station for the readying and perforating from FIG. 2.
Figure 4:
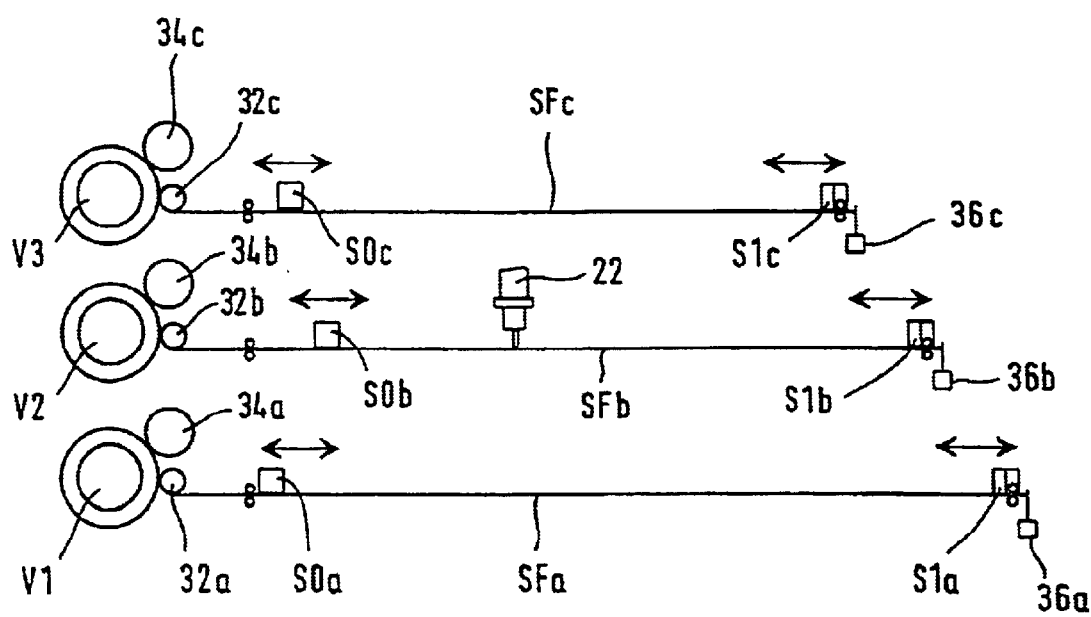
FIG. 4 shows, in a lateral view and schematically, a film-roll arrangement with three supply rolls lying one above another, in accordance with FIG. 2.

Arranged above the passenger vehicle P are three supply rolls V1 to V3 which are arranged one above another and from which film is pulled off and is readied in the station II (cf. also FIGS. 3 and 4).

The industrial robot IR1 is provided with a perforating tool 22 with which it can perforate the protective film pulled off from the supply rolls V1 to V3 and readied. The film is therefore already perforated in the station II, i.e. before the transfer of the pulled-off film by the application robots IR2 and IR3. As a result, the film for that section of the passenger vehicle P which is next to be covered can be perforated during the time in which the application robots IR2, IR3 place the film onto that section of the passenger vehicle P which is to be covered at that moment. During the transfer of the film by the application robots IR2, IR3, further film is pulled off at the same time from the corresponding supply roll and stretched out between the two suction strips S0, S1 of the film-readying station II for the subsequent perforating. This functional sequence is described in detail below with reference to FIG. 6. The perforating can be done using a suitable tool, for example a heated indenting wheel, a heated gouger or even a laser. Perforating tools of this type are described by the applicant in German Patent Application 197 18 204.6. The perforating tool can be guided with one or more robots, for example SCARA-robots, 6-axle bent-arm robots, or other types of robots. The perforating tool can be designed, for example, in such a manner that the travelling around curves and therefore perforating of curved contours takes place directly via the activation/rotation of the axis of the robot hand (cf. the abovementioned German Patent Application 197 18 204.6). In another refinement of the invention, the perforating tool is guided by the robot predominantly rectilinearly in one or more planes. The travelling around curves and therefore perforating of curved contours takes place by means of an additional, controlled pivot in the perforating tool itself. In this case, the perforating tool or the additional pivot can be attached to the robot flange directly or via a type of extension arm. Alternatively, the guiding of the perforating tool in one or more planes can also take place via one or more x-y moving units. The travelling around curves and therefore perforating of curved contours likewise takes place by means of an additional, controlled pivot in the perforating tool itself.

Of course, it is also possible for the perforating of the protective film to be carried out only after the taking-over and cutting-off of the film from the supply roll. The protective film is then held by the suction strips S2, S3 during the perforating by the application robots IR2, IR3.

FIG. 3 shows, in detail, in a schematic illustration, the readying of film in the station II. For this purpose, the film is pulled off from the supply roll V1 to a predetermined length and stretched out in a fold-free manner between the two suction strips S0 and S1. In contrast to the comb-shaped strips described by the applicant in the mentioned applications, the two suction strips S0 and S1 essentially have a rectangular cross section. Only at their longitudinal ends are cut-outs 30 provided in order to facilitate the gripping of gripping elements assigned to each suction strip S0, S1.

With the film SF stretched out between the suction strips S0, S1, the respectively assigned gripping elements G0, G1 are closed and secure the pulled-off film SF in the stretched-out state. This measure serves, on the one hand, as a securing means, if the suction power in the suction strips S0, S1 should drop, and on the other hand, the transfer of the pulled-off film SF to the application robots IR2, IR3 is facilitated by the gripping elements G0, G1. In particular, the use of the gripping elements G0, G1 means that no comb-shaped suction strips have to be used.

Furthermore, a compensating roller 32 is provided for the regulated and defined pulling-off of the film from the supply roll V1, which roller defines a straight pulling-off line for the film. Furthermore, a measuring wheel which acts upon the supply roll V1 and is intended for measuring the pulled-off film length is provided. If the overall length of pulled-off film reaches a predetermined maximum value, a signal is triggered by the measuring wheel that the supply roll has to be replaced. This replacement can be done both manually and also under automation.

Use is advantageously made of supply rolls whose film supply is sufficient at least for the requirements of one working shift. This ensures that the particular supply roll only has to be exchanged once per working shift.

The first clamping of the film between the two suction strips S0, S1 can take place manually or under partial mechanization. The beginning of the film is pulled-off manually from the roll and then the film is pulled off up to the front suction strip S1 and then sucked up by the two suction strips S0, S1. For the manual pulling forwards of the film either working personnel or an appropriate auxiliary apparatus is required. Alternatively to this, a fully automatic film-roll replacement unit with manual pre-fitting can also be used.

As already mentioned with reference to FIG. 2, in the film-readying station II a plurality of film supply rolls can be arranged, in particular one above another or optionally also next to one another, and corresponding, pulled-off film sections can be readied one above another or next to one another. Each of the readied film sections is then correspondingly held stretched out by two suction strips and successively perforated by the perforating tool 22 of the industrial robot IR1.

As illustrated in FIG. 4, the corresponding suction strips are arranged in such a manner that the suction strips S1a, S1b, S1c which hold the front film edge are arranged in a staggered manner so that the application robot, which takes over the film SF, of the station III can take over the film with a straight-edged suction strip. The distance and the arrangement of the rear suction strips S0a, S0b, S0c with respect to the front suction strips S1a, S1b, S1c is selected in accordance with the required perforation region. The rear suction strip S0 can be moved if appropriate in order to be able to adapt the clear width between the suction strips S0 and S1 to the required perforation region. As a result, the film can be stretched better during the perforating.

In the case of a plurality of supply rolls arranged one above another, these supply rolls can also be arranged in a staggered manner, such that the supply rolls can be exchanged from above by means of an auxiliary apparatus, for example a hoisting unit suitable for this. As an alternative to this, a pivoting-in apparatus can also be provided in which the supply rolls are picked up laterally from the readying means, then raised to the correct height and subsequently placed by means of a pivoting movement into the film-readying position. The removal of the empty roll core takes place in the reverse sequence. An arrangement of the supply rolls directly one above another is more advantageous for this.

Figure 5:
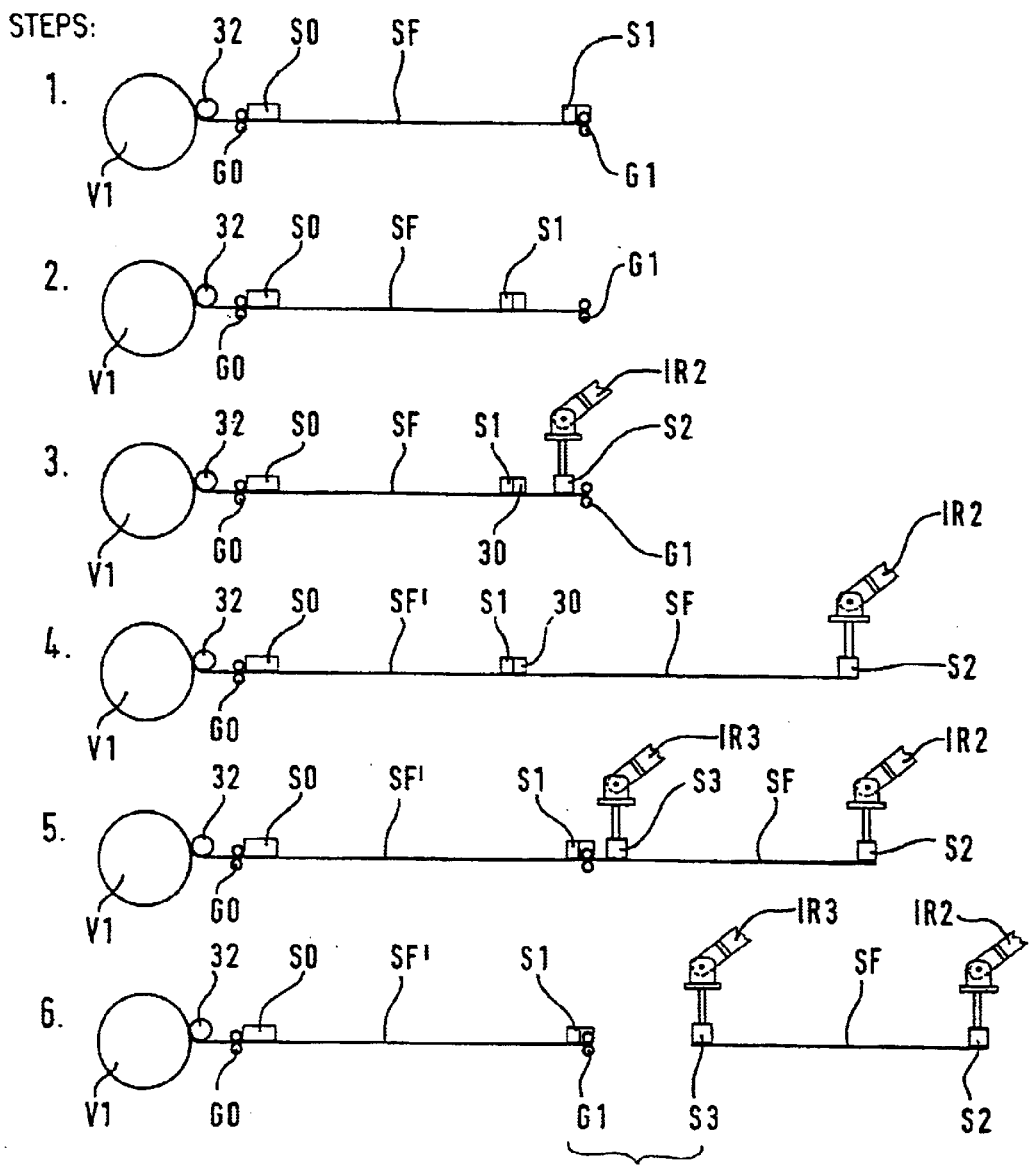
FIG. 5 illustrates, in a schematic sequence, the pulling-off according to the invention of film from the supply roll and its transfer into the follow-on station.

The taking-over of the pulled-off film piece SF by the application robots IR2, IR3 of the station III from the readying station II is shown in FIG. 5.

As already explained above, the pulled-off film piece SF is stretched out in a fold-free manner between the two suction strips S0, S1 and the gripping elements G0, G1 assigned to the suction strips S0, S1 are closed (step 1).

In step 2, the suction strip S1 is then ventilated and moved a small way, for example approximately 100 to 200 mm, in the direction of the suction strip S0. In this position, the suction strip S1 then sucks-up the film again. The front film end is only held in this state by the gripping element G1.

In step 3, the application robot IR2 moves with its suction strip S2 directly behind the gripping elements G1 and sucks up the film end. The outlined measure of moving the suction strips and the temporary holding of the film by means of the gripping elements permits the use of suction strips having a straight edge, as compared with the previously used, comb-shaped suction strips. As soon as the film end has been sucked up at the suction strip S2 of the application robot IR2, the gripping elements G1 are opened and moved away laterally, i.e. perpendicularly to the direction in which the film is pulled off, sufficiently far for the application robot IR2 to be able, with its suction strip S2, to pull the film in the pulling-off direction of the film. In order to pull off the film, the two suction strips S0, S1 are ventilated and the gripping elements G0 opened.

Using the suction strip S2 the application robot IR2 pulls the film off from the roll to a desired length (cf. step 4).

After that, in step 5, the suction strip S1 moves forwards back to its original position again and sucks up the film at this point. The gripping elements G1 likewise move back into their previous position and grip the film in the region of the corresponding cut-outs 30 of the suction strip S1. Furthermore, the suction strip S0 also sucks up the film again and its associated gripping elements G0 are closed. The film is now stretched again between the two suction strips S0, S1 of the film-readying means. After that, the application robot IR3 assigned to the application robot IR2 moves with its suction strip S3 to the so-called take-off position of the film directly in front of the suction strip S1 of the film-readying means and sucks up the film there.

In the following step 6, the cutting-off unit 36 (not illustrated in greater detail in FIG. 5) uses its knife 38 to cut off the film between the suction strip S1 of the film-readying means and the suction strip S3 of the application robot IR3.

The film piece SF which has already been pulled off and held in a stretched-out state between the suction strips S0, S1, but has not yet been severed from the supply roll V1, has therefore been pulled off further by the action of the application robot IR2 with its suction strip S2, so that the following film SF' has been transported between the readying suction strips S0, S1. The film piece SF which has been taken over by the suction strips S2, S3 of the application robots IR2, IR3 and has been severed from the now readied film piece SF' is then moved along the linear axes L1, L2 into the application station III by the application robots IR2, IR3.

Figure 11:
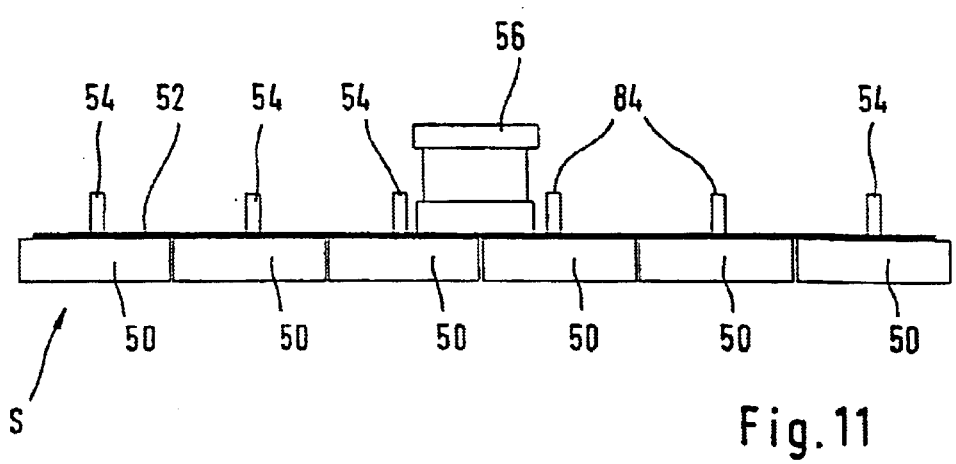
FIG. 11 shows, in an enlarged illustration, a suction strip for holding protective film.

FIG. 11 shows, in a lateral sectional illustration, a suction strip S for use in the readying and/or application station. The suction strip S has an essentially rectangular cross section and, in contrast to known suction strips, consists of a plurality of suction chambers 50 which are arranged next to one another and are fastened to a support 52. Each suction chamber 50 is in each case assigned a vacuum connection 54. On that side of the chambers 50 which points downwards in the drawing, suitable holes are provided in order to suck up the protective film lying below them. The suction strip S is arranged on the particular industrial robot by means of a flange 56 fastened to the support 52. The refinement of the suction strip S with a plurality of chambers lying next to one another and separated from one another has the advantage that films of different widths can be handled by one suction strip. For this purpose, the vacuum connections 54 are activated selectively.

Figure 6:
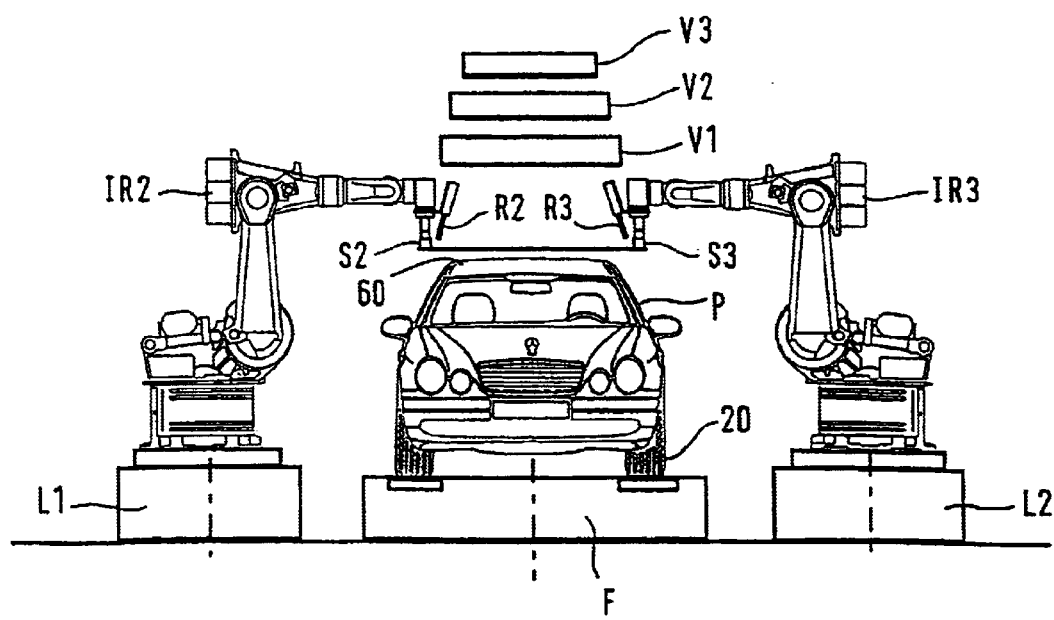
FIG. 6 shows a front view of the station for the covering of the passenger vehicle with protective film of the application line from FIG. 1.

FIG. 6 shows, in a front view, the application station III with a passenger vehicle P standing between the two application robots IR2, IR3. The application robots IR2, IR3 hold by means of their particular suction strip S2, S3 a film piece, which is to be applied, at its opposite edges. In the illustration of FIG. 6, the application robots IR2, IR3 hold the film piece held by them over the roof 60 of the passenger vehicle P.

Figure 7:
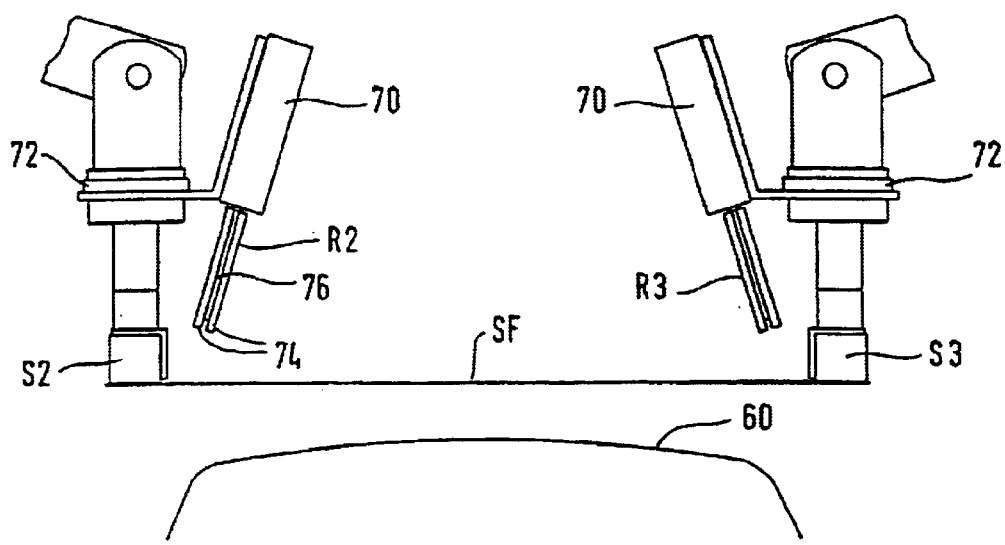
FIG. 7 shows, in an enlarged detail of FIG. 5, the alignment of protective film which is to be applied over a vehicle roof which is to be covered.

FIG. 7 shows, in an enlarged detail illustration, a section of the vehicle roof 60 of the passenger vehicle P with the film aligned above it. In the positioning of the film above the vehicle region which is to be taped down, a maximum possible negative pressure prevails in the suction system acting upon the suction strips S2, S3. In the positioning above the engine bonnet and in the case of the boot lid, the film has to be stretched over the vehicle transversely to its longitudinal axis, for which reason the film web has to be rotated through 90° after being taken over from the readying station II, so that the suction strips S2, S3 no longer stand parallel but transversely to the conveying direction of the application line 10. In the case of an application to the vehicle roof, the film is stretched longitudinally over the vehicle, so that rotation is not required. Of course, in the case of another arrangement of the supply rolls and of the film-readying means, a corresponding procedure has to be undertaken.

Figure 8:
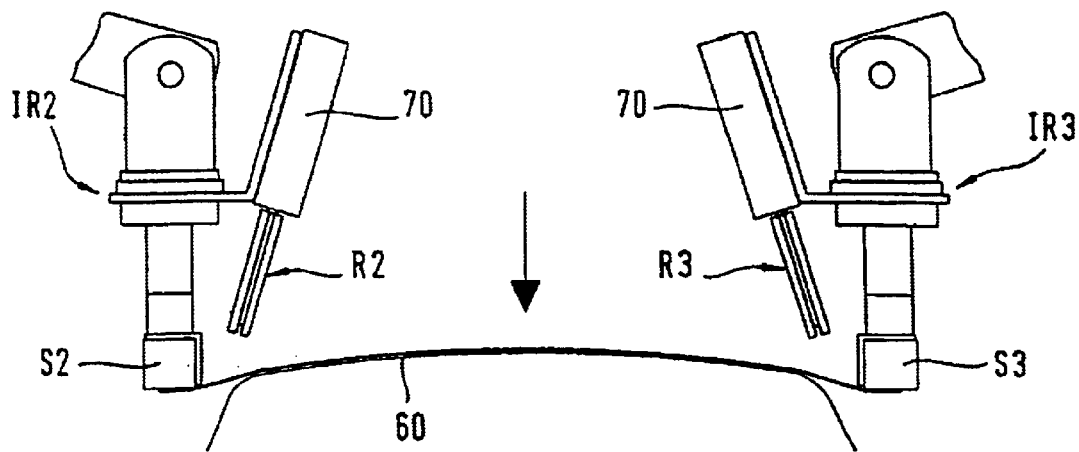
FIG. 8 shows, in a continuation of FIG. 7, the lowering and placing of the film onto the vehicle roof.

As can be seen from FIG. 8, the two application robots IR2, IR3 lower the film held stretched out by them uniformly onto the vehicle body, here the vehicle roof 60, in the direction of the marked arrow. The placing of the film onto the vehicle body surface causes increasing tension in the film. In order to limit this tension, a so-called bypass is switched on in a defined manner in the suction system in order to enable the film to "slide off" from the suction strips S2, S3. During further lowering, the bypass can optionally be increased in size further. The application, described in conjunction with FIGS. 7 and 8, of film to the vehicle body roof applies in a corresponding manner to other vehicle body regions.

Figure 9:
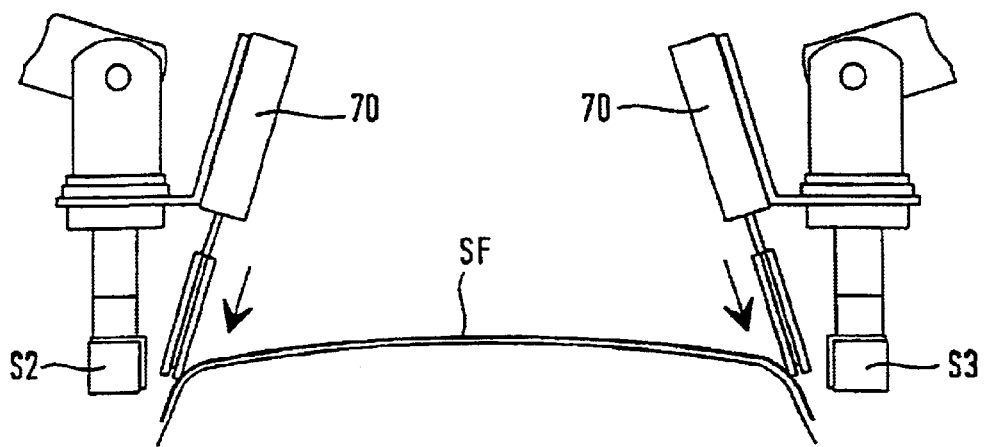
FIG. 9 shows, in a continuation of FIG. 8, the pressing of the film onto the vehicle roof.

At the same time, the doctor blades R2, R3 can be extended, as result of which the film can be pressed onto the vehicle body in the boundary region in a defined manner by means of the extended doctor blades R2 and R3 (cf. FIG. 9). By means of the pressing-on of the film using the doctor blades R2, R3, the film is completely pulled off from the suction strips S2, S3. In order to assist the sliding off, during the lowering the suction strips S2, S3 can optionally be set obliquely, which is not illustrated in greater detail in the drawing. This has the effect that the film slides off from the suction strips S2, S3 at an optimum angle. At the same time, the associated doctor blade R2, R3 can optionally be set in an optimized manner.

Figure 10:
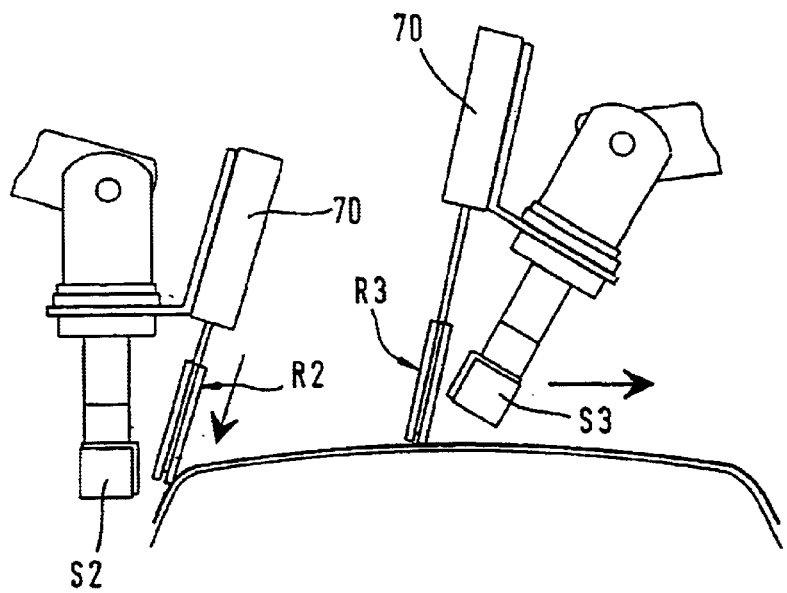
FIG. 10 shows, in a continuation of FIG. 9, the doctoring of the film applied to the vehicle roof.

After the film has been placed on, the said film is firmly doctored with the extended doctor blade R2, R3 as is illustrated in FIG. 10. Depending on requirements, the doctoring regions are divided between the two application robots, IR2, IR3. For example, the division can take place in such a manner that in the case of the engine bonnet and the boot lid, each of the application robots IR2, IR3 essentially doctors half the region from the middle outwards, it being possible for a certain overlapping region to be provided. It is also conceivable for one industrial robot to doctor from the outside towards the centre and for the other industrial robot at the same time to doctor from the centre towards the outside. In the case of the vehicle roof, preferably one of the two application robots doctors the entire roof from the front to the rear. Effective overlapping of the movements enables the cycle time of the application line 10 to be optimized. The application robot which is already finished with doctoring the applied film can therefore be moved back to the readying station II and can take over and pull off the front end of the readied film section there until the other robot has finished its doctoring process and can then take over the rear end of the pulled-off film piece.

FIG. 12 shows, in a front view, the next section of the application station III with the industrial robots IR4 and IR5 which are each fitted with a taping down tool 80. The industrial robots IR4, IR5 serve to apply film strips to vehicle regions which are not yet covered by the essentially rectangular film pieces applied by the application robots IR2, IR3. Furthermore, with their taping down tools 80, the industrial robots IR4, IR5 serve to attach securing adhesive tape to the film edges which are exposed to the wind.

The application of the film strips and of the securing adhesive tape preferably takes place following the above-described doctoring, but may optionally already also take place prior to the doctoring.

As a first step, the free surfaces which are still relatively large are taped down with a film strip of approximately 100 mm width. It may be necessary for this for a plurality of strips to be applied next to one another.

Subsequently, edges of the applied films or film strips which are exposed to the wind are taped down with a narrower securing adhesive tape of approximately 40 mm width. FIG. 13 shows a plan view of the ready-covered passenger vehicle P with film pieces applied to the roof, the rear flap and the engine bonnet. Various edge and corner regions which have not yet been covered by the film pieces are taped down with film strips (cf. also the detail enlargement of FIG. 13). Finally, the edges exposed to the wind are taped down with securing adhesive tape (cf. also the detail enlargement). The joints and gaps between the engine bonnet and mudguards and also between the rear lid and mudguards are then cut free.

The taping down is done with the taping down tool 80 which is explained in greater detail below with reference to FIG. 14. If appropriate, a cutting tool (knife and/or hot air blower) may also be integrated in the taping down tool in order to be able to cut open the glued-over joints and beads of the passenger vehicle body.

Figures 14A, 14B:
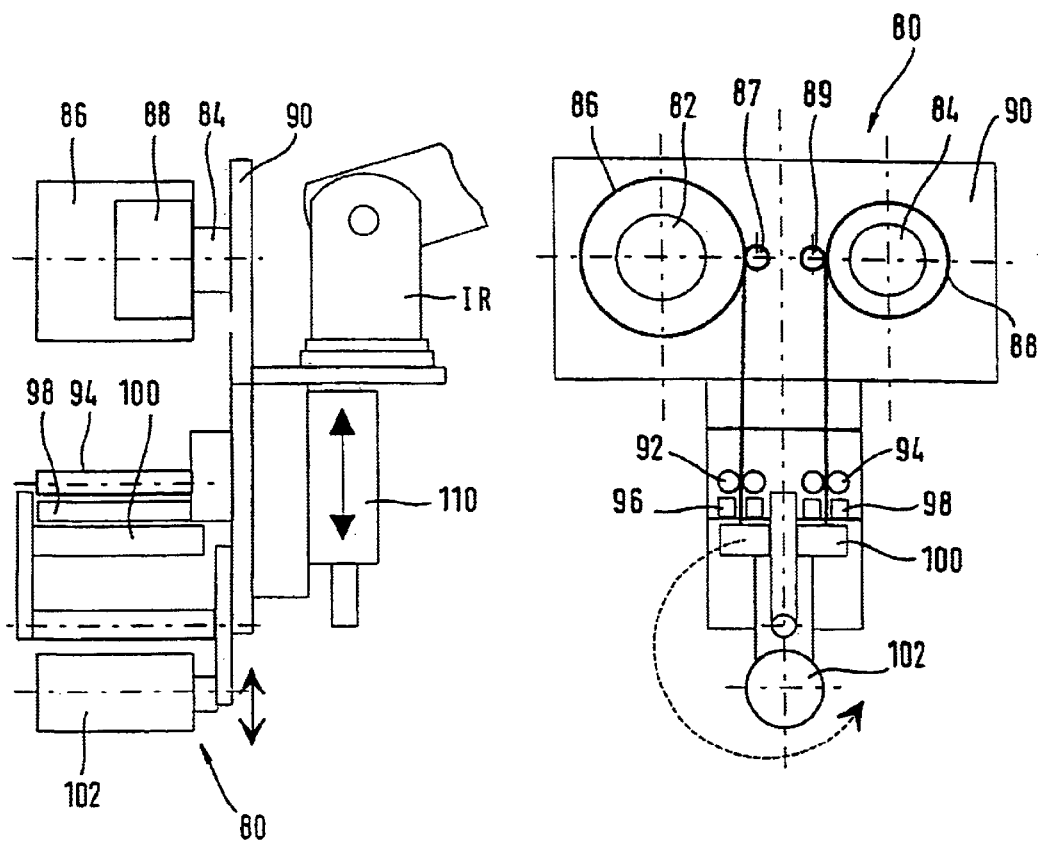
FIG. 14 shows, in a front and side view, a taping down tool according to the invention.
Figure 15A:
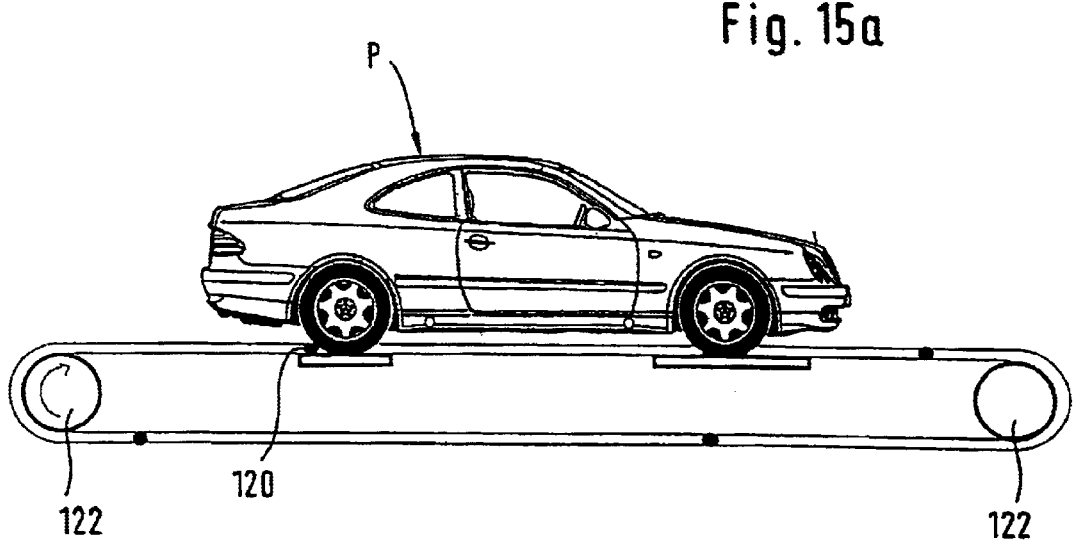
FIG. 15 shows, in a side and rear view, a passenger vehicle arranged on a double-strand drag chain for conveying along the application line.
Figure 15B:
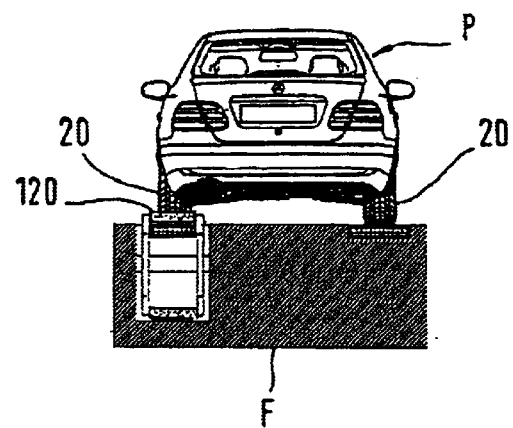

FIG. 14 shows an exemplary embodiment of a taping down tool for use with the invention, in a lateral illustration (FIG. 14*a*) and in a plan view (FIG. 14*b*). In the embodiment illustrated, the taping down tool 80 comprises two mounts 82, 84 respectively for a film roll 86 and a roll 88 with securing adhesive tape. For the defined pulling-off, each roll has its own compensating roller 87, 89. The mounts 82, 84 are fastened to a plate 90 which is connected in turn to the robot arm of one of the industrial robots IR4, IR5.

In the illustration of FIG. 14, the plate 90 is extended downwards and furthermore serves for the fastening of tape holders 92, 94 assigned to the rolls mounted on the mounts 82, 84 and of cutting-off units 96, 98 arranged downstream of the tape holders. Below the cutting-off units 96, 98 a tape gripper 100 and also a pressing-on roll 102 are provided.

Using the described taping down tool 80, it is possible, according to the same principle described below, for both the film strip from the film roll 86 and also for the securing adhesive tape from the roll 88 to be applied successively in any desired sequence. For this purpose, the respectively desired tape is grasped at the beginning of the tape by the tape gripper 100 and then guided around the pressing-on roll 102, in the direction of the arrow marked in FIG. 14*b*, so that the adhesive side of the gripped tape points outwards, i.e. downwards. The taping down tool 80 together with the pressing-on roll 102 can now be lowered onto the vehicle body section which is to be covered, with the result that the beginning of the tape lying around the pressing-on roll 102 bears and adheres with its adhesive side on the vehicle body.

After that, the tape gripper 100 lets go of the tape and moves on further into its inoperative position illustrated in the figure. By means of a slight moving back of the taping down tool 80 and of the pressing-on roll 102, the beginning of the tape is pressed on in a correctly fitting manner. Subsequently, the taping down tool 80 is moved forwards over the vehicle body and, via the pressing-on roll 102, presses the tape onto the vehicle body. The pressing-on roll 102 is advantageously suspended in a skipping manner in order to obtain the necessary pressing-on pressure, to be able to optimally follow the contour of the vehicle body and to compensate for tolerances of the vehicle body.

The unrolling of the securing adhesive tape or of the film strip can take place, for example, by means of a tape pull via the already taped-down tape piece, via a friction drive in which the tape is wrapped around a drive roll, or by means of a tape-roll drive (either directly or via a drive roll or compensating roller).

In order to avoid excessive pulling forces on the tape during the application, the pulling-off of the tape should take place in a regulated manner. For this purpose, for example, the friction drive or the tape roll drive can be regulated in terms of the tape-pulling force by means of a deflecting roller which is arranged on a rocker.

After the desired tape length has been applied minus a cutting length which is to be taken into consideration, the tape is cut off in an accurately fitting manner using the cutting-off unit 96 or 98 and the cutting length is pressed on by further forwards movement of the press-on roll 102.

Subsequently, the tape gripper 100 grips the beginning of the tape of the next tape required and the application cycle begins anew. In order to ensure that the beginning of the tape is held ready and therefore gripped by the tape gripper 100 in a defined manner, prior to the cutting-off by the cutting-off unit 96, the tape is secured above the cut by the corresponding tape holder 92, 94. The tape holders 92, 94 and the tape gripper 100 are designed in such a manner that the tape does not adhere to them. This is achieved, for example, by forming the surface with indentations or studs and/or from an appropriate non-stick material.

It is also conceivable for a taping down tool only to have the components for mounting and handling for a roll and for one or more taping down tools to be attached next to one another on a robot, if required. This would have the advantage that each taping down tool can be optimized for the particular roll/tape type. The taping down tools can then be used after one another as desired. For this purpose, the corresponding press-on rolls are then extended or retracted as required.

The taping down tool 80 also advantageously includes a cutting tool 110 which, in the exemplary embodiment illustrated, is arranged on the rear side of the plate 90. The cutting tool 110 is arranged in a moveable manner and comprises a knife and/or hot air blower for cutting free glued-over gaps and beads. A cutting tool of this type is described by the applicant in detail in German Patent Application 197 18 204.6.

Furthermore, the taping down tool can include a doctor blade (not illustrated in greater detail) of small width for subsequently doctoring the film, film strips or securing adhesive strips and/or for doctoring certain vehicle body regions. This doctor blade is advantageously fastened on a slide or adjusting cylinder (likewise not illustrated in greater detail).

The supply rolls for the taping down tool are dimensioned and configured in such a manner that as few new rolls as possible have to be exchanged during the working shift. If a replacement is nevertheless required, the robot can, for example, be brought into a roll-replacing position in which a new roll is inserted manually by an employee. Alternatively, an automatic roll change is also conceivable, in which a pre-fitted roll is automatically inserted in the taping down tool or in which the previous taping down tool is automatically exchanged for another pre-fitted taping down tool.

The taping down tool can be of overall modular design, with the result that one or more film rolls and/or rolls with securing adhesive tape are arranged on a bonding tool. In the smallest module unit there is only one roll for the film strip or securing adhesive tape, and depending on requirements, the taping down tool comprises two or more modules which are fastened next to one another on the robot. A further module is the cutting tool.

The conveying system F which has already been mentioned is described below with reference to FIGS. 15 to 18.

As already mentioned, the finished vehicle which is to be covered (the passenger vehicle P in the exemplary embodiments illustrated) is guided through the application line following the principle of a car wash. In this case, the ready-fitted vehicle is situated on its own wheels 20 and when being introduced into the entry station I is roughly aligned there in the transverse direction of the vehicle, for example via markers, and in the longitudinal direction of the vehicle, for example by means of an entry stopper which can be pivoted upwards. After that the vehicle-specific data are determined, this taking place, for example, via barcode readers or via manual input with reference to a vehicle operation sheet.

The vehicle is then gripped by a carrier 120 gripping the rear wheel and is conveyed further. This is done, for example, as illustrated in FIG. 5, by means of a carrier 120 arranged on an endless belt driven via rolls 122.

As the first station after the entry station, the passenger vehicle P is situated in the film-readying station II in which the perforation required for this vehicle can then already be carried out. Finely positioning the vehicle is not yet necessary at this point.

The next conveying cycle conveys the passenger vehicle P on further via the carrier 120 into the station III for the application of the film. Before the film is applied, the passenger vehicle P has to be positioned as precisely and finely as possible. The positioning in the X direction takes place, for example, by means of aligners 124 which are arranged in a longitudinally moveable manner, are advantageously designed in the form of wedges and finely position the vehicle by positioning of the rear wheel.

The fine positioning in the Y direction advantageously takes place by means of rolls arranged longitudinally. This principle is shown in a highly schematic manner in FIG. 17, FIG. 17*a* showing two wheels 20 of a vehicle to be positioned on the positioning apparatus, in a front view, and FIG. 17b showing the wheels 20 of FIG. 17a, in a plan view.

The positioning apparatus 130 comprises a plurality of rolls 132 which are arranged with their longitudinal axes parallel to the conveying direction of the vehicle and on which the wheels 120 rest. The rolls 132 are arranged parallel to one another in a horizontal plane and are mounted rotatably between holding rails 134 in each case arranged on the end sides.

The positioning apparatus 130 furthermore comprises aligners 136, 138 which, in the exemplary embodiment illustrated, are of rod-shaped design and can be adjusted by means of a drive device 140 (for example, a gear wheel drive or worm drive) transversely to the conveying direction in the direction of the marked arrows. In order to finely position the passenger vehicle P, the aligners 136, 138 are moved into a position acting upon the wheels 20 and, by acting upon the wheels 20, can adjust the latter on the rolls 134 in the Y direction until the required positioning is reached. The uniform extension of the two aligners causes the vehicle always to be aligned centrally irrespective of track width and wheel size.

Figure 18:
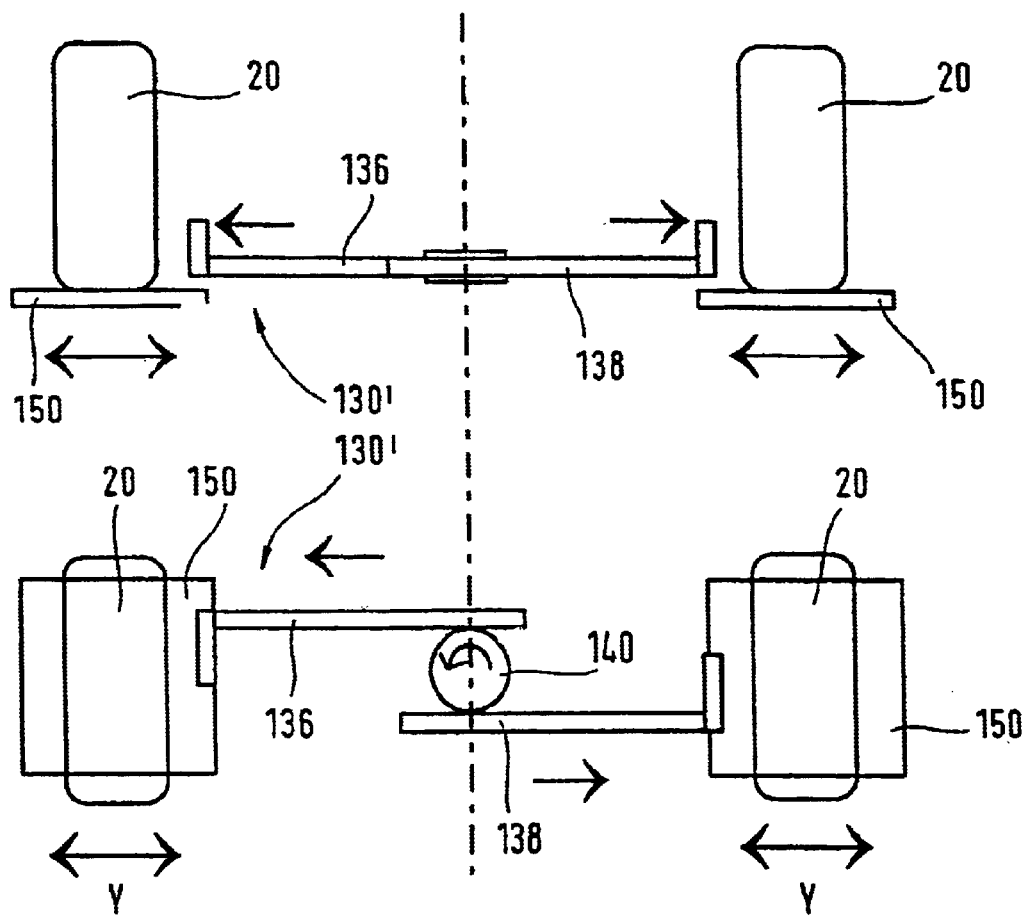
FIG. 18 clarifies the principle of the vehicle positioning in the transverse direction by means of transversely displaceable floating slides.

The vehicle positioning in the Y direction can also be realized, following the outlined principle, using floating slides 150 on which the wheels 20 of the passenger vehicle P rest (cf. FIG. 18).

In a further design, the conveying of the vehicle body standing on a slide can take place using conventional conveying technology. In the application station III the slide is then finely positioned using skid clamping devices and guide rollers (not shown).

The adaptation in the positioning to vehicle type takes place by means of different robot programs.

What is claimed is:

1. A method for applying self-adhering, protective film to a surface portion of a vehicle body, comprising:
   A. pulling off a film piece from at least one supply roll and preparing the film piece in a stretched-out, fold-free state by at least two separately moveable holding elements in a readying station;
   B. transferring the film piece from the readying station to an application station, wherein the transferring comprises:
      holding the film piece at one end by a holding element guided by a first application robot;
      pulling the film piece from the at least one supply roll to a desired length, thereby preparing a second film piece that is behind the film piece, wherein the second film piece is held in a stretch-out, fold-free state by the at least two separately moveable holding elements of the readying station;
      holding the film piece at another end of the desired length by a holding element guided by the first application robot or a second application robot;
      cutting the film piece of the desired length held on opposite edges from the second film piece;
   C. applying the film piece transferred into the application station by lowering the film piece in a positionally correct manner by at least one application robot onto a surface portion of the body; and
   D. pressing the applied film piece onto the surface portion in a fold-free and bubble-free manner;
      wherein the film piece is doctored by a doctor blade attached to the robot guiding holding element.

2. A method according to claim 1, further comprising, before the transfer of the film piece, making perforation lines in a positionally correct manner in the film piece by the an application robot comprising a device that is movable in a programmed manner and having a perforating tool.

3. A method according to claim 1, wherein the film piece is held in the readying station at a free end by a first holding element and at a supply roll end by a second holding element.

4. A method according to claim 3, wherein the transferring of the film piece comprises:
   taking up the free end of the film piece by a first, robot-guided holding element from the first holding element;
   pulling the film piece to the desired length from the supply roll;
   holding a supply roll end of the film piece in a region of the first holding element by a second, robot-guided holding element; and
   cutting off the film piece between the first holding element of the readying station and the second robot-guided holding element.

5. A method according to claim 4, wherein the first and second robot-guided holding elements are guided by at least one application robot.

6. A method according to claim 1, wherein at least two supply rolls are arranged above one another or next to one another in the readying station, and holding elements are assigned to the at least two supply rolls for preparing pulled-off film pieces in a stretched-out and fold-free state.

7. A method according to claim 1, further comprising, after applying the film piece, covering remaining body sections with film strips by a robot-guided taping down tool.

8. A method according to claim 7, further comprising, after applying the film piece and the film strips, taping down edges of the applied film piece that are exposed to wind with a securing adhesive tape by a robot-guided taping down tool.

9. A method according to claim 8, wherein the covering with film strips and the taping down edges are performed with the same taping down tool.

10. A method according to claim 8, further comprising cutting free joints and beads that have been glued over with a cutting tool that is attached to the taping down tool.

11. A method according to claim 1, wherein the holding elements are suction strips.

12. A method according to claim 1, wherein the holding elements are assigned gripping elements.

13. An apparatus for the automated, series application of self-adhering, protective film on a surface portion of a vehicle body, comprising:
   a readying station comprising at least two separately moveable holding elements for pulling off a film piece in a fold-free, stretched-out state from at least one supply roll; and
   an application station comprising at least one application robot for transferring the film piece from the readying station by two holding elements acting on opposite edges of the film piece and two industrial robots which each guide a holding means for holding the film piece transferred from the readying station and for applying it to a surface of the vehicle body.

14. An apparatus according to claim 13, further comprising a cutting unit of the readying station for severing the pulled-off film piece from a second film piece pulled behind the film piece.

15. An apparatus according to claim 13, further comprising a compensating roller assigned to the at least one supply roll.

16. An apparatus according to claim 13, wherein the readying station further comprises a perforating tool guided by an industrial robot for making predetermined perforation lines in the film piece.

17. An apparatus according to claim 13, wherein at least two supply rolls are arranged one above another.

18. An apparatus according to claim 17, wherein the readying station further comprises two holding elements, each assigned to a supply roll for holding and preparing a film piece in a stretched-out state.

19. An apparatus according to claim 13, further comprising gripping elements which are assigned to the at least one holding element of the readying station.

20. An apparatus according to claim 13, wherein each holding element is assigned a doctor blade for smoothing the film piece applied to the surface of the vehicle body.

21. An apparatus according to claim 13, wherein the doctor blade is extendable.

22. An apparatus according to claim 13, wherein the at least one holding element is a suction strip.

23. An apparatus according to claim 22, wherein the suction strip comprises a plurality of suction chambers, which are arranged next to one another and are fastened to a support, wherein each suction chamber is assigned a vacuum connection.

24. An apparatus according to claim 13, wherein the application station further comprises an industrial robot having a taping down tool.

25. An apparatus according to claim 24, wherein the taping down tool comprises a cutting tool for cutting joints and beads which that have been glued over.

26. An apparatus according to claim 13, further comprising a conveying system for automated conveying of the vehicle body along an application line through the readying station and the application station.

27. An apparatus according to claim 26, wherein the conveying system comprises a positioning apparatus for finely positioning the vehicle body perpendicularly with respect to a conveying direction.

28. An apparatus according to claim 27, wherein the positioning apparatus comprises:
   a plurality of rolls which are arranged with their longitudinal axes parallel to the conveying direction of the vehicle body and on which wheels rest; and
   aligners which are moveable into position acting on the wheels of the vehicle body.

29. An apparatus according to claim 27, wherein the positioning device comprises floating slides on which wheels of the vehicle body rest.

* * * * *